United States Patent

Frohman-Bentchkowsky

[15] 3,641,512

[45] Feb. 8, 1972

[54] INTEGRATED MNOS MEMORY ORGANIZATION

[72] Inventor: Dov Frohman-Bentchkowsky, Los Altos, Calif.

[73] Assignee: Fairchild Camera and Instrument Corporation, Mountain View, Calif.

[22] Filed: Apr. 6, 1970

[21] Appl. No.: 26,004

[52] U.S. Cl. ..........................340/173 R, 307/238, 307/279

[51] Int. Cl. .....................................G11c 5/02, G11c 11/00

[58] Field of Search..........................340/173; 307/238, 279

[56] References Cited

UNITED STATES PATENTS 3,490,007 1/1970 Igarashi..............................307/238 X 3,493,786 2/1970 Ahrons et al. ..........................340/173

OTHER PUBLICATIONS

"Electronics Review" Vol. 41, No. 22 pp. 49-50. Electronics, Oct. 28, 1968

*Primary Examiner*—Maynard R. Wilbur

*Assistant Examiner*—Joseph M. Thesz, Jr.

*Attorney*—Roger S. Borovoy, Alan MacPherson and Charles L. Botsford

[57] ABSTRACT

A semiconductor memory array consists of an array of MNOS transistors. Each transistor possesses an hystereris relationship between the gate voltage required to turn on the transistor and a previously applied gate voltage. Thus each MNOS transistor stores, by itself, one bit of information. A binary "1" is written into a transistor by applying a voltage of a first selected magnitude to the gate of the MNOS transistor while grounding its source and drain. Applying simultaneously a negative voltage to the drain of the MNOS transistor lowers the voltage across the dielectric beneath the MNOS transistor's gate electrode and prevents the storage of a binary "1." No electrical isolation is required between the MNOS transistors.

5 Claims, 8 Drawing Figures

INVENTOR
DOV FROHMAN-BENTCHKOWSKY
BY Alan H. MacPherson
ATTORNEY

INVENTOR
DOV FROHMAN-BENTCHKOWSKY
BY Alan H. MacPherson
ATTORNEY

INVENTOR
DOV FROHMAN-BENTCHKOWSKY
BY
ATTORNEY

INTEGRATED MNOS MEMORY ORGANIZATION

BACKGROUND OF THE INVENTION

1. Field of the Invention

This invention relates to semiconductor memories and in particular to a semiconductor memory structure which stores one bit of information per transistor in the memory and which uses a common substrate with no isolation between adjacent storage transistors in the array.

2. Description of the Prior Art

Semiconductor memory devices are well known. For example, Gribble et al., in U.S. Pat. No. 3,218,613, issued Nov. 16, 1965, disclose a semiconductor memory using four active transistors for each bit of information stored. The four transistors are interconnected so as to form two bistable circuits. Binary information is stored in the circuit by pulsing a selected transistor in a first bistable circuit so as to turn on this transistor. The particular transistor turned on indicates whether a binary "one" or "zero" is stored. Information is read out of the circuit nondestructively by pulsing the emitters of the transistors in the first bistable circuit and then detecting which transistor in the second bistable circuit turns on.

Another semiconductor storage device is disclosed in U.S. Pat. No. 3,487,376, issued Dec. 30, 1969, to T. W. Hart, Jr. This patent discloses a memory array wherein each storage cell in the array comprises two pairs of transistors. Again, to store a bit of binary information, a plurality of transistors are required.

The use of more than one transistor to store each bit of information is inefficient, decreasing the number of memory cells which can be located on a given wafer of semiconductor material. Moreover, if the memory array uses bipolar transistors, isolation is required between each memory cell in the memory array. Typically, an isolation diffusion is used to electrically insulate one memory cell from adjacent memory cells. Such isolation regions consume a large portion of the wafer area and further reduce packing density. Finally, if power to the semiconductor memory is shut off, the information stored in the memory is immediately lost.

SUMMARY OF THE INVENTION

This invention overcomes certain of the above disadvantages of semiconductor memory units and provides a semiconductor memory unit capable of storing a binary bit in a single transistor. The structure of this invention eliminates the need for isolating each storage cell from adjacent storage cells and makes possible the use of a common substrate. As in the prior art semiconductor units, the readout from the invented semiconductor memory is nondestructive. But in addition, the memory has the ability to hold the information stored therein despite power failures and other interruptions of the normal operating conditions of the memory.

According to this invention, a semiconductor memory array is constructed of a plurality of MNOS transistors. Each transistor exhibits a hysteresis relationship between the applied gate voltage and the transistor turn-on voltage. Thus each transistor is capable of storing one binary bit of information. Associated with each memory array is appropriate read, write and biasing circuitry.

Isolation regions between adjacent MNOS transistors are eliminated by use of the discovery that writing of information into a given MNOS transistor can be controlled by simultaneously and selectively controlling the source and drain voltages and gate voltages of the MNOS transistors in the array.

DETAILED DESCRIPTION

Figure 1:
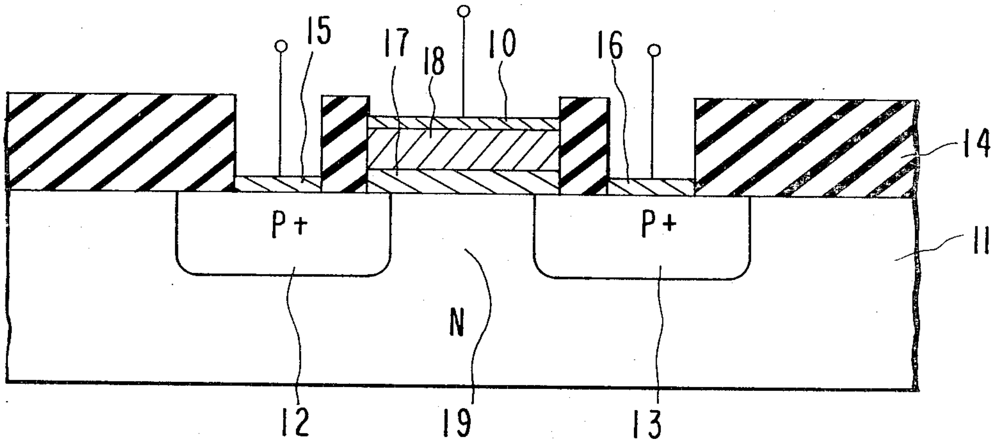
FIG. 1 shows, in cross-sectional view, a typical MNOS structure used in this invention.

FIG. 1 shows a cross-sectional view of an MNOS transistor structure. The memory array of this invention contains numerous such transistors in the same die of semiconductor material. Substrate 11, of N-type semiconductor material, typically silicon, has diffused into it P+-type source and drain regions 12 and 13 respectively. Source 12 is separated from drain 13 by a region 19 of N-type substrate 11. Overlying the surface of region 19, as well as small parts of the PN-junctions between source 12 and substrate 19 and between drain 13 and substrate 19, are selected layers of insulation together with conductive gate 10. First, a layer 17 of a silicon oxide, typically silicon dioxide, is placed over this region followed by a layer 18 of silicon nitride. The conductive gate 10 is then placed on the silicon nitride. Typically, gate 10 is aluminum, although a doped semiconductor gate, such as doped polysilicon, can also be used, if desired.

Oxide layer 17 is typically a thermal oxide ranging in thickness from 15 angstroms up to on the order of 500 angstroms. This oxide layer has a low surface state density of charge at the interface of oxide 17 with underlying silicon 19. On the other hand, silicon nitride layer 18, which typically ranges in thickness between 400 to 600 angstroms, introduces the traps which serve as the sites for the stable stored charge. Overlying those portions of the surface of the device not covered by the conductive gate and underlying dielectric or by metal contacts to the source 12 and drain 13 regions, is a layer 14 of silicon dioxide. An additional nitride layer can, if desired, overlie silicon dioxide layer 14. This nitride layer (not shown) passivates the memory array. Metal layers 15 and 16 and contact source 12 and drain 13 respectively.

H. A. R. Wegener, et al., in a paper entitled "The Variable Threshold Transistor, a New Electrically-Alterable, Non-destructive Read-Only Storage Device" presented at the IEEE International Electron Devices Meeting, Washington, D.C., Oct. 1967, suggested that the variable turn-on voltage MNOS transistor could be used in random access and read-only semiconductor memories as well as in digital circuits requiring substantially permanent storage capability.

J. T. Wallmark and J. H. Scott, Jr., in a paper entitled "-Switching and Storage Characteristics of MIS Memory Transistors," presented at the IEEE International Electron Devices Meeting, Washington, D.C. in Oct. 1968, demonstrated that the MNOS structure with a thin thermal oxide layer of no more than 15 angstroms exhibits hysteresis behavior of turn-on voltage $V_T$ as a function of the applied gate voltage $V_C$. They postulated that this hysteresis resulted from stable charge storage at the silicon-nitride silicon-dioxide interface.

While some work had been done in an attempt to understand the mechanism by which an MNOS device exhibits hysteresis in the relationship between transistor turn-on voltage and a previously applied gate voltage, a detailed explanation of this phenomenon in terms of basic properties of the MNOS device was first made in a paper entitled "Charge Transport and Storage in Metal-Nitride-Oxide-Silicon Structures" published in the Journal of Applied Physics, Vol. 40, No. 8, pages 3,307–3,319, July 1969, by D. Frohman- Bentchkowsky and M. Lenzlinger. Frohman-Bentchkowsky and Lenzlinger showed that the charge accumulation at the nitride-oxide interface for an oxide layer thicker than 50 angstroms was controlled by the requirement for continuity of current through the dielectric under steady-state conditions. Either positive or negative charge was accumulated at the interface depending upon the polarity of the charging voltage and the relative current-field characteristics of the silicon-nitride silicon-dioxide layers. The charge is retained for a period of time which is a function of the time required to reach a steady-state current flow condition in the dielectric. Frohman-Bentchkowsky and Lenzlinger showed that this time required to reach steady-state conditions in the nitride-oxide structure is on the order of $10^8$ seconds at 125° C. Thus, for all practical purposes, the accumulated charge is a permanently stored charge, being retained even when power to the device is shut off. Similar principles may also explain the behavior of thinner oxides. The explanation of the charge accumulation mechanism developed by Frohman-Bentchkowsky and Lenzlinger and described in their above-entitled paper is herein incorporated by reference into this specification.

Figures 2A, 2B, 2C:
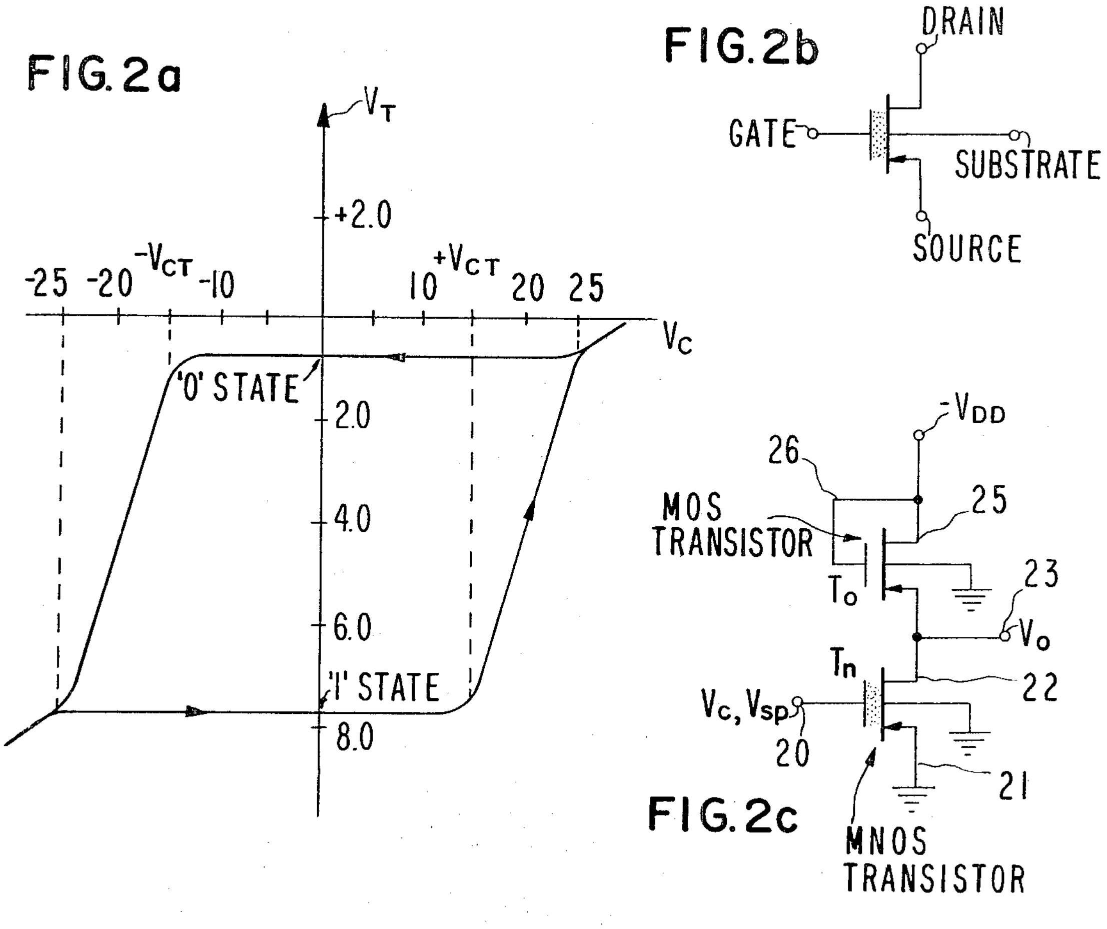
FIG. 2*a* shows the hysteresis relationship between turn-on voltage $V_T$ and gate voltage $V_C$ for the MNOS structure of FIG. 1.
FIG. 2*b* shows the symbol used to represent the MNOS transistor exhibiting hysteresis, and identifies the gate, drain, source and substrate leads.
FIG. 2*c* shows how the MNOS transistor used as a storage unit in this invention is connected to an MOS resistor for the purpose of reading out information stored in the MNOS transistor.

FIG. 2*a* shows the hysteresis relationship between MNOS transistor turn-on voltage $V_T$ and the gate voltage $V_C$. The gate voltage $V_C$ is defined as the voltage difference between the gate and the surface of the underlying semiconductor region 19 (FIG. 1). From FIG. 2*a*, it can be seen that the application of a negative gate voltage $V_C$ less than $-V_{CT}$ results in the switching of the turn-on voltage $V_T$ from its normal value of around −1.0 volts to about −8.0 volts. A turn-on voltage of −8.0 volts is associated with an MNOS transistor in the "1" binary state. Subsequently, application of a gate voltage $V_C$ greater than $+V_{CT}$ results in shifting the turn-on voltage $V_T$ from about −8.0 volts back to about −1.0 volts. With this turn-on voltage, the MNOS transistor is said to be in the "0" state, and stores a binary zero.

As discussed in the above cited paper by Frohman-Bentchkowsky and Lenzlinger, the hysteresis relationship between turn-on voltage $V_T$ and gate voltage $V_C$ is a function of the transient behavior of the MNOS device. This phenomenon depends upon the fact that the charging time of the MNOS device in response to either a positive or negative gate voltage $V_C$ greater than the absolute value of $V_{CT}$, is at least a few orders of magnitude faster than the discharge, in response to zero gate voltage, of the charge accumulated at the oxide-nitride interface. Actually, in the absence of the gate voltage, the equivalent charging voltage producing current flow through the dielectric is equal to the corresponding flat band voltage $V_{FB}$. This time response difference between current flows in response to a gate voltage on the order of ± 25 volts and a gate voltage on the order of zero volts is the key feature in practical applications of the MNOS transistor as a memory element since this time response difference leads directly to the hysteresis behavior of induced interface charge shown in FIG. 2*a*.

FIG. 2*b* shows the symbol used to represent the MNOS device in this application. The shaded area between the gate and the underlying substrate differentiates the MNOS transistor symbol from the symbol for a typical MOS transistor. Source, drain and substrate electrodes are shown identically to the way these electrodes are shown with an MOS transistor.

FIG. 2*c* shows the way the state of the MNOS transistor, i.e., whether the MNOS transistor is in its "1" or "0" state, is determined. A sampling voltage $V_{sp}$ is applied to gate electrode 20. The source of this transistor is connected by electrode 21 to ground while the drain of this transistor is connected by electrode 22 to the source of an MOS resistor. Output lead 23 is attached to both the drain of the MNOS transistor and the source of the MOS resistor. The gate of the MOS resistor is connected by lead 26 to the lead 25 attached to the drain of the MOS resistor. Lead 25 is attached to negative voltage source $-V_{DD}$. The substrates of both the MOS resistor and MNOS transistor are grounded. A sampling pulse, with an amplitude between the transistor turn-on voltage for the "0" and the "1" states, is applied to gate 20. Typically, the amplitude of the sampling pulse is given by $$V_{sp} = [\ V_t(1) + V_t(0)\ ]/2.$$

However, to decrease the response time, the sampling pulse amplitude should be made closer to the "1" turn-on voltage than to the "0" turn-on voltage. The sampling pulse will turn on an MNOS transistor in the "0" state but an MNOS transistor in the "1" state will remain off, resulting in "low" or "high" output voltage, respectively, on lead 23 for the two states. A "low" output voltage is defined as a voltage on lead 23 close to ground, though slightly negative. A "high" output voltage is defined as a negative voltage somewhere between ground and $-V_{DD}$, but clearly further from ground than the "low" output voltage. No variation of turn-on voltage will result from the sampling operation since the sampling voltage is less than the absolute value of $V_{CT}$. Hence the readout is nondestructive.

In addition, removal of the power supply has no effect on the charge stored at the dielectric interface. The device maintains a 4-volt margin in turn-on voltage $V_T$ between the "0" and the "1" states after 100 hours at 125° C. with no power.

As shown in FIG. 2*a*, to switch the MNOS device from the "0" state to the "1" state, the gate voltage $V_C$ must be less than $-V_{CT}$ with respect to the channel. Application of a negative voltage to the gate of an MNOS device places an electric field across the dielectric with the field strength determined solely by the magnitude of the gate voltage provided the source and drain are grounded. However, dropping the source and drain voltages simultaneously with the application of the gate voltage results in a smaller differential voltage across the dielectric. Consequently, an MNOS device can be prevented from switching from the "0" state to the "1" state by simultaneously with the application of a negative gate voltage, applying a negative voltage to the source and drain terminals. This negative voltage has a magnitude sufficient to prevent a voltage difference greater than $V_{CT}$ from being applied across the dielectrics between the gate and the underlying channel region. Actually, application of a negative voltage to just the drain is sufficient to prevent the transistor from changing its state. This occurs because the channel induced by the gate voltage ensures that the source will be at the drain's potential.

Figure 3D:
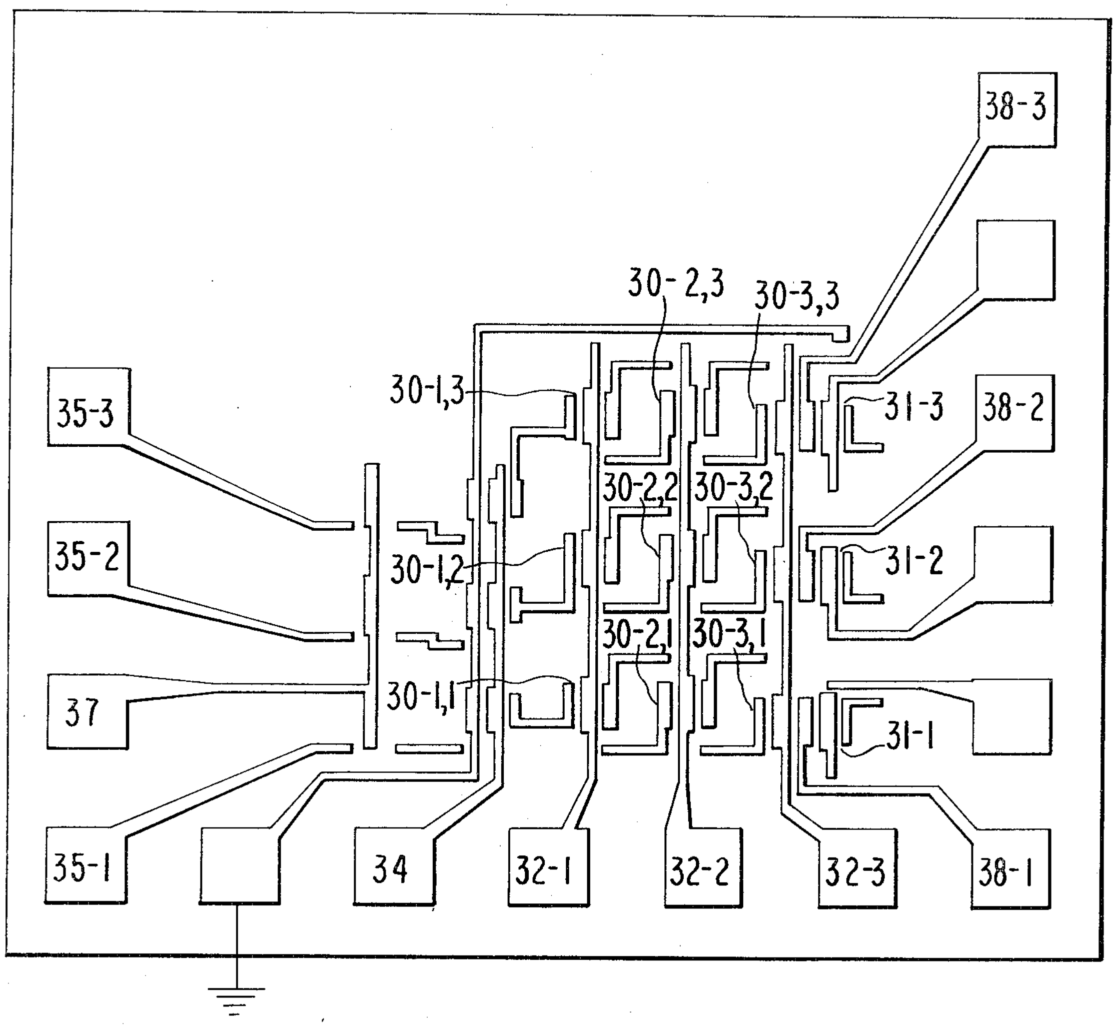
FIG. 3*d* shows the layout of the circuit of this invention on a semiconductor substrate.
Figures 3A, 3B, 3C:
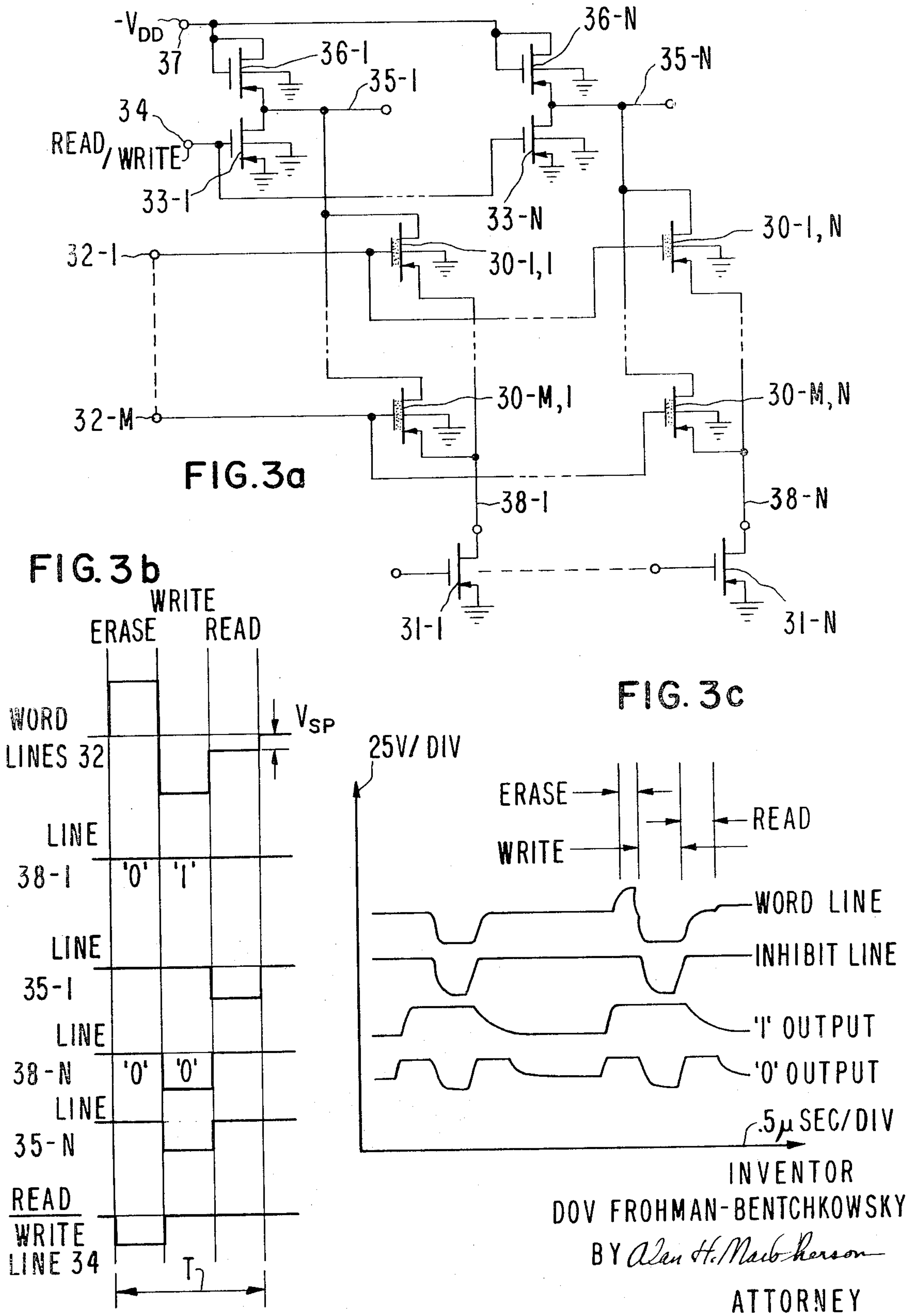
FIG. 3*a* shows an array of MNOS transistors of the type shown in FIG. 2*b* and 2*c;*
FIG. 3*b* shows the relationship between the erase, write and read pulses used to place information in and obtain information from the memory array of FIG. 3*a;*
FIG. 3*c* shows the erase, write and read waveforms used with a memory array built using the principles of this invention.

FIG. 3*a* shows a memory array constructed using the MNOS device described above. Containing M·N elements comprising MNOS transistors 30-1, 1 through 30-M, N, arranged in M rows and N columns, the array has the capacity to store M·N binary bits. Sequences of bits stored in prearranged MNOS transistors are defined to be words. The operation of the array of FIG. 3*a* will be described in conjunction with placing a bit of information into MNOS transistor 30-1,1.

First, the array must be cleared or "erased." All words can either be cleared simultaneously or on a word-by-word basis. To clear all words simultaneously, a positive pulse ($V_C$ = +25 volts) is applied to word lines 32-1 through 32-M. To clear only the Mth word, a positive pulse is applied to word line 32-M. To prevent breakdown of the dielectric overlying the source and drain regions of transistors 30, these source and drain regions must be kept at a potential close to ground. This is done by applying a negative voltage to the gates of MOS transistors 31-1 to 31-N and 33-1 to 33-N sufficient to turn on these transistors.

Next, binary 1's are written into selected MNOS transistors 30 by applying a negative voltage ($V_C$ = −25 volts) sequentially to word-lines 32-1 through 32-M. The particular MNOS transistors 30 into which information is written in each word line are controlled by the "bit-select" signals on lines 38-1 through 38-N. These signals control the potentials of the sources of the MNOS transistors in a given word line. Simultaneously, zero voltage is applied to read-write line 34. A negative voltage thus appears on all drain regions of MNOS transistors 30. To inhibit the writing of a binary "1" in selected columns of MNOS transistors 30, the "bit-select"

MOS transistors 31-1 through 31-N corresponding to these columns are turned off by placing zero voltage on their gate leads. The sources of those transistors 30 connected to these corresponding bit-select MOS transistors 31 then assume the negative voltage of the drains of these transistors 30 through the conductive channels induced in the corresponding MNOS transistors 30. This keeps the voltage differences across the silicon nitride and oxide layers between the gate electrodes and the underlying channels of these MNOS transistors smaller than the voltage difference necessary to switch these MNOS transistors to the "1" state. Consequently, a binary "0" is retained in these MNOS transistors.

However, those MNOS transistors 30 whose sources are kept at ground potential by applying a negative voltage to the gates of the corresponding MOS transistors 31 (thereby to form a conductive channel from the source of the corresponding MNOS transistor 30 to ground through MOS transistor 31) have sufficient voltage differences across the silicon nitride and oxide layers underlying their gates to store additional charge at the dielectric interface. Thus a binary "1" is written into these MNOS transistors.

The state of an MNOS transistor in a given word line 32 will be indicated by the voltage levels on the corresponding one of leads 35-1 through 35-N. Application of a negative sampling voltage to a given word line, say line 32-1, will turn on any MNOS transistor 30-1, 1 through 30-1, N in the zero state resulting in a "low" output (or close to zero) voltage on the corresponding lead 35. An MNOS transistor in this line in the "1" state will remain off, resulting in a "high" (i.e., clearly negative) output voltage on the corresponding lead 35. MOS transistors 31 are turned on during sampling.

FIG. 3*b* shows graphically the relationship between the voltage pulses on word lines 32, source lines 38, drain lines 35, and read-write line 34 during erase, write and read operations. As shown, to erase information stored in those MNOS transistors 30 connected to word line 32-1, a positive pulse is applied to word lines 32-1 and a negative pulse is applied to read-write line 34, thereby grounding the drains of all MNOS transistor 30.

Next, to write a binary "1" into, for example, MNOS transistor 3.-1, 1, a negative pulse is applied to the word line 32-1 associated with MNOS transistor 30-1, 1 and a negative pulse is also applied to the gate of MOS transistor 31-1. The voltages on the gates of MOS transistors 31-2 through 31-N are left at zero. Consequently, lines 38-2 through 38-N (only line 38-N is shown in FIG. 3*a*) are at approximately the negative voltage of the drains of MNOS transistors 30-1, 2 through 30-1, N due to the conductive channels formed in these MNOS transistors in response to the negative voltage on line 32-1. The gate voltage on MOS transistor 31-1 however is sufficiently negative to turn on MOS transistor 31-1. Therefore the voltage on line 38-1 stays near ground and holds the source of transistor 30-1 near ground. Throughout this writing cycle, no gate voltage is applied to read-write line 34; MOS transistors 33-1 through 33-N thus remain turned off. Consequently, the voltage on lines 35-2 through 35-N goes negative to a voltage somewhere between ground and $-V_{DD}$. The drain of MNOS transistor 30-1, 1, however, is connected to the approximately grounded source of transistor 30-1, 1 by the conductive channel induced in this MNOS transistor. Consequently, a binary 1 is placed in MNOS transistor 30-1, 1 while binary zeros remain in MNOS transistors 30-1, 2 through 30-M, N.

To read out the information stored in MNOS transistor 30-1, 1, a sampling voltage $V_{sp}$ is applied to word lines 32-1. Line 35-1 goes negative indicating a binary "1" is stored in MNOS transistor 30-1, 1. Line 35-N stays near ground showing that a binary zero is stored in MNOS transistor 30-1, N. Of course, simultaneously with the sampling voltage, a negative voltage is applied to the gates of MOS transistors 31-1 through 31-N, turning on these MOS transistors.

FIG. 3*c* illustrates the actual waveforms obtained from an MNOS memory array built using the principles of this technique. These waveforms are interpreted in the same manner as the idealized waveforms shown in FIG. 3*b*.

FIG. 3*d* shows a top view of the contacts to an integrated circuit containing a 3×3 array of MNOS memory transistors. Note that the drains of MOS transistors 31-1 through 31-3 are connected directly to the sources of the MNOS transistors 30 in the corresponding columns.

It should be emphasized that none of the MNOS transistors in the memory array in FIG. 3*a* must be isolated by back-biased PN-junctions, dielectric isolation, or other techniques, from adjacent MNOS transistors. Rather, those MNOS transistors in which information is to be placed are selected by controlling the differential voltage across the dielectric between the gate and the underlying channel. This differential voltage is controlled by controlling the voltages of the sources and drains of the MNOS devices. In fact, the voltage of the source of each MNOS can be controlled solely by controlling the voltage of the corresponding drain so long as the sources are connected through high impedances to ground. MOS transistors are used for these high impedances. Control pulses applied to the gates of selected ones of these MOS transistors allow information to be read into selected MNOS transistors.

One possible problem with the array shown in FIG. 3*a* is that the MNOS transistors in a given column, for example transistors 30-1, 1 through 30-M, 1 in column 1, are connected in parallel. That is, the drains of transistors 30-1, 1 through 30-M, 1 are all connected to lead 35-1 and the sources of these transistors are all connected to lead 38-1. Accordingly, if one of the MNOS transistors has a positive turn-on voltage in the "0" state, rather than a negative turn-on voltage in the "0" state as shown in FIG. 2*a*, this MNOS transistor will always be turned on in the "0" state for zero gate voltage. When this MNOS transistor is in the "0" state, the application of a sampling voltage to another MNOS transistor in the same column will always yield an output voltage on lead 35-1 corresponding to a binary "0" even if the MNOS transistor to which the sampling voltage is applied contains a binary "1." To prevent this from happening, a bias gate voltage larger than the highest gate turn-on voltage of any MNOS transistor 30 in the array is applied to the rows of unread MNOS transistors. This bias voltage guarantees that these transistors are turned off while a given row of MNOS transistors is being read.

I claim:

1. A semiconductor memory array including an array of MNOS transistors of M rows and N columns, each transistor possessing an hysteresis relationship between the gate voltage required to turn on the transistor and a previously applied gate voltage, which comprises means for selectively writing information into said MNOS transistors, means for selectively and nondestructively reading information out of said MNOS transistors, and means for selectively erasing the information stored in said MNOS transistors, said reading, writing and erasing means including:

- a plurality of M word-lines, each word-line being connected to the gate electrodes of the MNOS transistors in a corresponding row of said array;
- a first set of N MOS transistors, the sources of said first set of N MOS transistors being connected to ground, and the drain of each of said first set of N MOS transistors being connected to the sources of the MNOS transistors in a corresponding column of said array;
- a second set of N MOS transistors, the gate of each of said second set of N MOS transistors being connected to its drain so as to form N MOS resistors, and the drains of all of said second set of N MOS transistors being connected to a selected voltage source; and
- a third set of N MOS transistors, the sources of said third set of N MOS transistors being connected to ground, the gates of said third set of N MOS transistors being connected to a read-write line and the drain of each of said third set of N MOS transistors being connected directly to the drains of those MNOS transistors in a corresponding column of said array and to the source of a corresponding one of said second set of N MOS transistors.

2. Structure as in claim 1 wherein said selected voltage source is a first negative voltage.

3. Structure as in claim 2 wherein said means for selectively erasing information in selected ones of said MNOS transistors further comprises means for applying a negative voltage to the gate electrodes of said first set of N MOS transistors;

means for applying a positive voltage of selected magnitude to said word-lines connected to the gates of said MNOS transistors in said array; and means for applying a negative voltage to the gates of said third set of N MOS transistors, thereby to turn on both said first set and said third set of MOS transistors so as to connect the sources and drains of said MNOS transistors in said array to ground.

4. Structure as in claim 2 wherein said means for selectively writing information into selected ones of said MNOS transistors further comprises means for applying a negative voltage of a first selected magnitude to the word-line connected to the gate electrodes of selected ones of said MNOS transistors;

means for applying a negative voltage of a second selected magnitude to the gates of those ones of said first set of N MOS transistors connected to the source regions of those MNOS transistors connected to said word-line into which information is to be written, thereby to ensure that the full magnitude of the voltage applied to said word-line is applied across the dielectrics of those MNOS transistors into which information is to be written while a voltage of lesser magnitude is applied across dielectrics between the gate electrodes and the channels of those MNOS transistors into which information is not to be written due to these channels assuming a negative voltage of lesser magnitude than said first negative voltage, but of sufficient magnitude to prevent the changing of the charge stored in the dielectrics of those MNOS transistors into which information is not to be written.

5. Structure as in claim 2, wherein said means for selectively and nondestructively reading information out of, further comprises;

means for applying a negative sampling pulse to a selected word-line;

means for applying a negative pulse to the gates of said first set of N MOS transistors to turn on these transistors; and means for detecting the output voltages on the drains of said third set of N MOS transistors, a voltage close to ground corresponding to a binary zero stored in the MNOS transistor connected to said selected word line and the corresponding MOS transistor in said third set, and a negative voltage corresponding to a binary one stored in the MNOS transistor connected to said selected word-line and the corresponding MOS transistor in said third set.

* * * * *